United States Patent [19]

Mross et al.

[11] Patent Number: 4,466,299
[45] Date of Patent: Aug. 21, 1984

[54] GYRO BEARING ASSEMBLY

[75] Inventors: James J. Mross, South Milwaukee; Howard F. Traeder; Robert M. Seidl, both of Milwaukee, all of Wis.

[73] Assignee: General Motors Corporation, Detroit, Mich.

[21] Appl. No.: 413,265

[22] Filed: Nov. 23, 1964

[51] Int. Cl.³ .............................................. G01C 19/06
[52] U.S. Cl. ...................................... 74/5.7; 74/5 R; 74/5.4; 308/8.1; 384/107; 384/111
[58] Field of Search ......... 308/9, 241 R, 8.1, DIG. 1; 74/5, 5.7, 5 R, 5.4; 384/107, 111

[56] References Cited

U.S. PATENT DOCUMENTS

| | | | |
|---|---|---|---|
| 2,649,808 | 8/1953 | Slater | 74/5 |
| 2,855,782 | 10/1958 | Grohe | 74/5.4 |
| 3,048,043 | 8/1962 | Slater | 74/5 |
| 3,242,742 | 3/1966 | Parker | 74/5 |

Primary Examiner—Donald P. Walsh
Attorney, Agent, or Firm—Albert F. Duke

[57] ABSTRACT

A gyro assembly including a rotor, stator, hysteresis motor and conical hydrodynamic bearings for supporting the rotor relative to the stator.

8 Claims, 3 Drawing Figures

GYRO BEARING ASSEMBLY

SUMMARY OF THE INVENTION

This invention relates to fluid lubricated bearings and, more particularly, to a combined radical and thrust type bearing having such desirable characteristics as to be particularly useful in gyroscopic apparatus where high precision bearings are necessitated.

Inertial guidance systems are generally employed in circumstances where longevity and high accuracy over extended periods of time are of paramount importance. These factors, as considered with respect to a gyroscope, are largely determined by the predictability of the behavior of the gyro rotor. This behavior, in turn, is influenced by the friction, compliances, torque and other operating characteristics of the bearings which support the rotor.

Traditionally, gyro rotors are supported by ball bearings. The ball bearing art is well advanced and excellent results using ball bearings are obtainable. However, the various relatively unpredictable characteristics occasioned by the presence of balls, rollers, and other physical structures between moving surfaces has degrading effects on the performance of bearings which at best can be minimized but not eliminated. As a result, efforts have been made to develop for gyros and other precision applications fluid bearings in which there is no physical structure between relatively rotating surfaces. Such bearings employ as support a thin film of air or other fluid.

One form of fluid bearing is the journal-thrust plate type. As indicated by the name, radial stiffness or resistance to displacement is determined by journal design while axial stiffness is determined by thrust plate design and, thus, these two characteristics are independent of each other. To match the stiffnesses to obtain the desired characteristic of isoelasticity requires a trial and error procedure involving design variations in no less than two areas.

A second form of fluid bearing, to which this invention relates, is the combined radial and thrust type fluid bearing and, more particularly, the hydrodynamic or self-lubricating combined bearing in which supporting pressure is generated by relative motion between the bearing surfaces. In a combined bearing, as opposed to a journal-thrust plate bearing, each sector of the bearing surface generates a pressure distribution and since the pressures act normal to the bearing surfaces, the resultant force on any element of area can be resolved into forces acting along the axis of rotation and normal to it. The relationship between the radial and axial force components can then be varied for any element of area simply by varying the bearing angle, which is defined herein as the angle between the support shaft axis, which is the axis of rotation, and the average plane of an element of area on the bearing surfaces. Thus, the resultant stiffnesses or the reciprocals thereof, known as compliances, in both the axial and radial directions can be varied by variation of the bearing angle. The proper angle, therefore, produces isoelasticity.

Relating this discussion to the invention, a bearing assembly is provided particularly, but not exclusively, for use in gyroscopic apparatus wherein the assembly comprises a generally cylindrical member such as a shaft provided with a pair of support means spaced a predetermined axial distance apart and defining a pair of outer combined radial and thrust bearing surfaces, and a second member disposed about the cylindrical member or shaft by means of an axial bore which at each end defines an inner combined radial and thrust bearing surface which copperates with the adjacent outer bearing surface to provide a fluid bearing. By filling the bearing gap between the bearing surfaces with a suitable fluid such as air or helium and providing means for rotating the members relative to one another a thin film lubrication between the bearing surfaces is produced.

According to a preferred form of the present invention, the desired characteristic of isoelasticity in a combined radial and thrust type bearing may be provided. This is accomplished by selection of the proper average bearing angle between the axis of rotation and the bearing surfaces from the relation $$\frac{K_{RAD}\cos \Psi}{K_{AXIAL}} = 2 \tan^2\phi \cos\Psi = 1 \qquad (1)$$

where $K_{RAD}$ is static radial compliance, $K_{AXIAL}$ is static axial compliance, $\phi$ is the bearing angle, and $\psi$ is the "attitude angle" of the bearing which is defined as the angle between an applied force vector and the resulting displacement vector in a plane $\perp$ to the spin axis. This equation expresses the relationship between projected axial and radial forces using the normal force vector resulting from integral effects on the pressure generating surface configuration assuming incompressible or compressible flow.

In a specific embodiment of the invention employing frustoconical bearing surfaces, a pressure generating configuration may be formed on selected bearing surfaces to hydrodynamically generate supporting and stablilizing pressures. This configuration preferably takes the form of a groove-pocket-land combination having predetermined dimensional relationships to afford optimum operating characteristics.

The invention may be best understood by reference to the following specification which is directed to a specific embodiment thereof in the form of a gyro rotor assembly employing a conical bearing arrangement, and is to be taken with the accompanying drawings of which:

Figure 1:
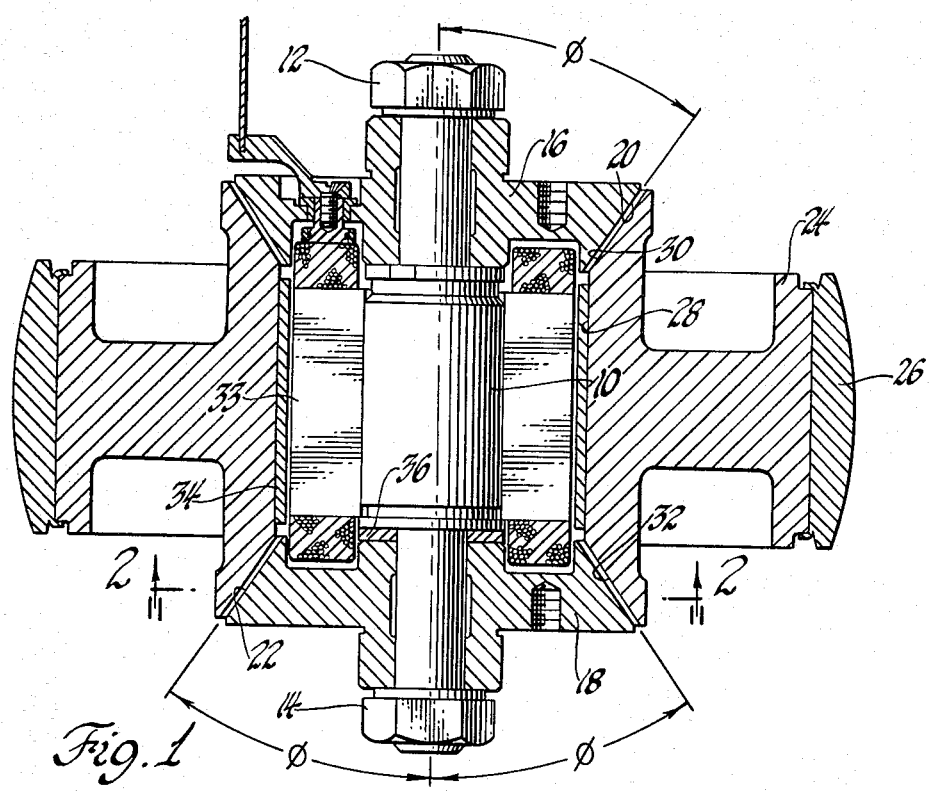
FIG. 1 is a sectional view of a gyro rotor assembly employing the invention.

In bearings for gyroscopic apparatus such as that shown in the drawings, it is desirable to achieve isoelasticity; that is, equal effective axial and radial compliances. It is also desirable to provide maximum stability and load bearing characteristics. To accomplish this latter objective, a sectorial pressure generating configuration is formed on one of the bearing surfaces. This configuration results in non-coincidence of the center of pressure for each sector and the centroid thereof, thus producing as attitude angle defined herein as $\psi$. This attitude angle is the angle between an applied force and the displacement vector in a plane perpendicular to the axis of rotation. Thus, the effective compliance in the radial direction is $K_{RAD} \cos \psi$. In accordance with a preferred design of the pressure generating configuration, the attitude angle may be reduced to small values, i.e., less than 10°. In such a case, the average bearing angle for achieving isoelasticity is where $$\frac{K_{RAD}}{K_{AXIAL}} = 1.$$

According to the equation given above, $2 \text{ TAN}^2\phi = 1$ when $\phi = 35.3°$.

This value assumes an isoelastic support; for example, the gyro gimbal. Thus, the 35.3° bearing angle may be adjusted within limits of about ±1.5° to achieve isoelasticity in actual practice.

Referring now more specifically to FIG. 1, the invention is illustrated and described in the form of a hydrodynamic conical fluid bearing employing frustoconical bearing surfaces. However, it is clear that the same consideration as regards the relation of bearing angle to isoelasticity apply to a semispherical combined type bearing wherein the average spherical angle conforms to the principles announced above.

The gyro rotor assembly shown in FIG. 1 includes a stator shaft 10 of generally cylindrical configuration and provided with clamping nuts 12 and 14 for holding the assembly together. Such means provides an independent cartridge assembly which can be completely assembled and tested in any suitable support. Mounted a predetermined axial distance apart on the stator shaft 10 is a pair of support members 16 and 18. The support members 16 and 18 are substantially alike and are each of generally frustoconical configuration to define a pair of opposing outer frustoconical bearing surfaces 20 and 22. As shown in FIG. 1, the bearing surfaces 20 and 22 open outwardly at a bearing angle which is measured from the axis of the stator shaft 10 and is designated by $\phi$. Mounted on the combination of the stator shaft 10 and the support members 16 and 18 for rotation thereabout is a rotor wheel 24 having a heavy rim portion 26 to provide the highest possible moment of inertia. The rotor wheel 24 is provided with a central bore 28 which is machined at the opposite axial ends thereof to form a pair of opposing inner frustoconical bearing surfaces 30 and 32. With the rotor wheel disposed about the stator shaft 10 so as to be both radially and axially centered, which is of course the normal operating position, the outer frustoconical bearing surfaces 30 and 32 also form a bearing angle which is measured from the axis of the shaft 10 and defined by $\phi$. The inner and outer frustoconical bearing surfaces are separated by a narrow gap which is filled with a fluid such as air or helium. Relative motion between the bearing surfaces of the rotor wheel 24 and those of the support members 16 and 18 produces a gas pressure which supports the rotor wheel 24 out of physical contact with the stator combination.

To provide the necessary rotation between the members shown in FIG. 1, a hysteresis motor is provided. This hysteresis motor comprises a motor stator 33 having appropriate windings about the stator shaft 10 for providing a rotating magnetic field, and a cylindrical hysteresis ring 34 which is affixed to the surface of the central bore 28 in the rotor wheel 24. As is well known to those skilled in the art, the hysteresis motor is a wound pole synchronous motor, the speed of which is a fuction of the frequency of the excitation voltage. The rotation theory of a hysteresis motor is well developed in the art and will not be discussed in detail. It should be noted that a heat conduction path from the motor winding 33 is provided through the stator shaft 10 and the support members 16 and 18 to the gimbal structure (not shown).

As it may be necessary or desirable under certain circumstances to vary the width of the gap between the inner and outer frustoconical bearing surfaces, means are provided in the form of a spacer 36 which may be of any desired thickness. It can be seen that by varying the thickness of the spacer 36 the combined radial and thrust gaps between the bearing surfaces are uniformly varied without effecting the cone angle $\phi$.

Figure 2:
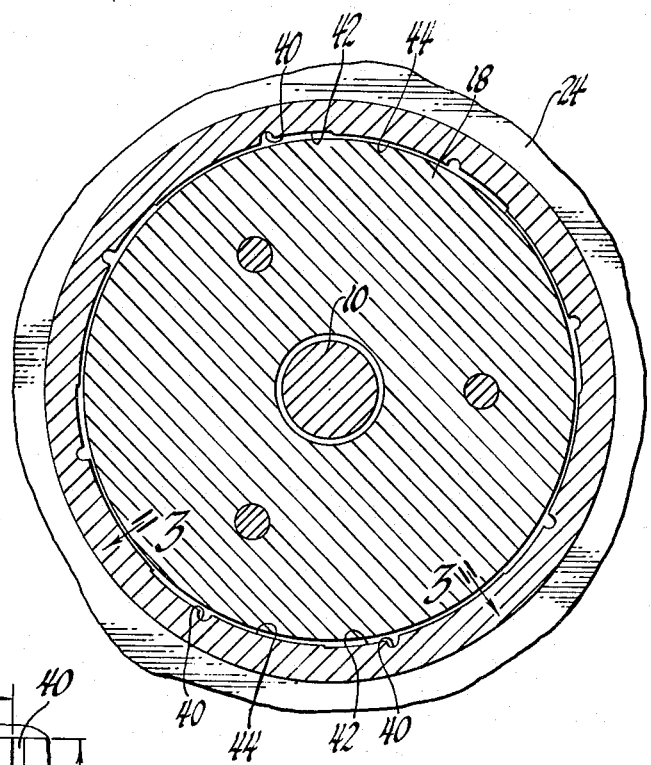
FIG. 2 is an end view of the rotor assembly of FIG. 1.
Figure 3:
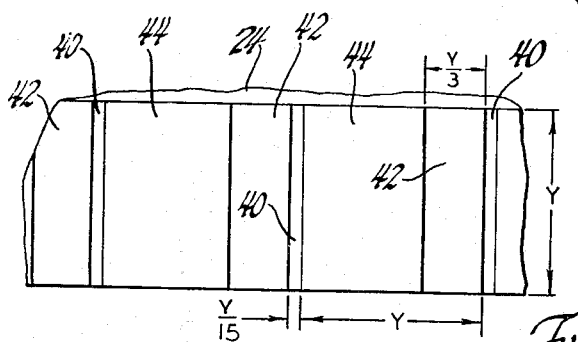
FIG. 3 shows a portion of the rotor bearing surface indicating the pressure generating configuration thereof.

As previously stated, the conical fluid bearing shown and described herein is of the self-lubricating or hydrodynamic type. Accordingly, it is desirable to impress on one of the bearing surfaces at each end of the rotor assembly a pressure generating configuration. In accordance with the present invention it has been found most advantageous to employ a version of the well-known Rayleigh step configuration. As shown in FIGS. 2 and 3, this configuration includes a plurality of pressure generating sectors each of which is made up of the circumferential combination of a lubricating groove 40, a recessed pocket 42 and a land 44. Furthermore, it has been found to be advantageous to impress this pressure generating configuration on the frustoconical bearing surfaces 30 and 32 of the rotor wheel 24 rather than on the frustoconical bearing surfaces 20 and 22 of the stationary support members 16 and 18. During actual running of the rotor assembly it is immaterial whether the pressure generating configuration is on either the stationary or rotating surfaces. However, it has been found that under certain circumstances and in certain applications the disposition of the gyro is such that during starting and stopping operations, the rotor wheel 24 always contacts on the stationary bearing surfaces a predetermined point causing a certain amount of wear at this point. Therefore, it can be seen that by impressing the pressure generating configuration on the rotor surface which is randomly oriented during start up and run down procedures, wear will be more evenly distributed about the pressure generating configuration and bearing life will be increased significantly.

As shown in FIGS. 2 and 3, the bearing surfaces 30 and 32 are provided with the Rayleigh step pressure generating configuration in an arrangement including eight 45° sectors, each of which defines a groove-pocket-land combination. As previously discussed, the attitude angle produced by this configuration is less than 10° and accordingly the bearing angle $\phi$ has been selected to be approximately 35.3° to yield the desired characteristic of isoelasticity in the bearing. In addition, optimum load bearing and stability in the performance of the high speed rotor assembly shown in the drawings is attained by selecting the circumferential dimensions of the groove-pocket-land combination 40, 42 and 44, respectively, to be such that the arc length of the land 44, and the pocket 42 are related by a ratio of approximately 2:1, as illustrated by dimensional characteristics in FIG. 3. Further, it has been found that the greatest bearing stiffness is attainable by selecting the bearing surface dimensions such that the width of the configuration as seen in FIG. 3 of the land is approximately equal to the sum of the arc length of the pocket 42 and the land 44 as also shown in FIG. 3.

While this invention has been described with reference to a specific embodiment thereof, it is to be understood that various modifications and additions may be made to this embodiment without departing from the spirit and scope of the invention, and for a definition of the invention, reference should be had to the appended claims.

What is claimed is:

1. Gyroscopic apparatus comprising the assembly of a solid stator shaft having an enlarged central section defining two axially spaced shoulders, support means mounted on the stator shaft a predetermined axial distance apart and abutting said shoulders, each of the support means defining an outer frustoconical bearing surface opening outwardly from the assembly, a rotor wheel having an axial bore through which the stator extends, the wheel having formed at each end of the axial bore and inner frustoconical bearing surface disposed in cooperative relation with and spaced from the adjacent bearing surface of the stator shaft to define a bearing gap, a fluid filling the gaps, hydrodynamic pressure generating configurations formed on each of the rotor bearing surfaces including a plurality of sectors each of which includes a groove-pocket-land combination, the ratio of the arc lengths of the land and pocket being approximately two, and drive means for rotating the rotor wheel about the stator shaft.

2. Apparatus as defined in claim 1 including means for adjusting the axial position of at least one of the support means relative to the stator shaft thereby to adjust the width of the bearing gap.

3. Hydrodynamic bearing apparatus comprising the combination of a substantially cylindrical shaft, a pair of support means mounted on the shaft a predetermined axial distance apart, each of the support means defining an outer combined radial and thrust type bearing surface, a member having a central axial bore and being symmetrical about the bore, the member having formed at each end of the bore an inner combined radial and thrust type bearing surface, the member being disposed about the shaft such that the outer bearing surfaces are disposed in facing relation to the inner bearing surfaces and spaced therefrom to define a bearing gap, the angle $\phi$ between the shaft axis and an average plane parallel to the bearing surfaces being approximately 35.3°, a fluid filling the gap, and a drive means for providing relative rotation between the shaft and the member.

4. Hydrodynamic bearing apparatus comprising the combination of a substantially cylindrical shaft, a pair of support means mounted on the shaft a predetermined axial distance apart, each of the support means defining an outer combined radial and thrust type bearing surface, a member having a central axial bore and being symmetrical about the bore, the member having formed at each end of the bore an inner combined radial and thrust type bearing surface, the member being disposed about the shaft such that the outer bearing surfaces are disposed in facing relation to the inner bearing surfaces and spaced therefrom to define a bearing gap, a fluid filling the gap, drive means for providing rotation between the shaft and the member, and hydrodynamic pressure generating configurations formed on one of the bearing surfaces at each axial end of the assembly including a plurality of sectors each of which includes in circumferential order a groove, a pocket and a land, the ratio of the arc lengths of the land and pocket being approximately two and the ratio of the sum of the arc lengths of the land and pocket to the width of the land being approximately one, the angle between the shaft axis and the average angle of the bearing surfaces being approximately 35.3°.

5. For use in a gyroscope, the assembly of a stator shaft, a pair of support members mounted on the shaft a predetermined axial distance apart, each of the support means defining an outer frustoconical bearing surface opening outwardly from the axis of the shaft at an angle of approximately 35.3°, a rotor member having an axial bore, the member having formed at each end of the bore an inner frustoconical bearing surface opening outwardly from the axis of the bore at an angle of approximately 35.3°, the rotor member being disposed about the shaft intermediate the support member with the inner and outer bearing surfaces spaced a predetermined distance apart to define a bearing gap, a fluid filling the gap, drive means for rotating the rotor member about the shaft, and hydrodynamic pressure generating configurations formed on one of the bearing surfaces at each axial end of the assembly.

6. The assembly as defined in claim 5 including means for adjusting the axial position of at least one of the support members relative to the stator shaft thereby to adjust the width of the bearing gap.

7. The assembly as defined in claim 5 wherein the hydrodynamic pressure generating configurations comprise a plurality of sectors each of which includes in circumferential order an axial groove, a pocket and a land, the ratio of the arc lengths of the land and pocket being approximately two and the ratio of the sum of the arc lengths of the land and pocket to the width of the land being approximately unity.

8. For use in a gyroscopic instrument, the assembly of a stator shaft, a pair of support members mounted on the shaft a predetermined axial distance apart, each of the support means defining an outer frustoconical bearing surface opening outwardly from the axis of the shaft at an angle of approximately 35.3°, a rotor member having an axial bore, the member having formed at each end of the bore an inner frustoconical bearing surface opening outwardly from the axis of the bore at an angle of approximately 35.3°, the rotor member being disposed about the shaft intermediate the support members with the inner and outer bearing surfaces spaced a predetermined distance apart to define a bearing gap, a fluid filling the gap, drive means comprising means disposed about the stator shaft to produce a rotating magnetic field and a cylindrical hysteresis member mounted in the axial bore of the rotor wheel intermediate the rotor bearing surfaces, and hydrodynamic configurations formed on one of the bearing surfaces at each axial end of the assembly.

* * * * *

UNITED STATES PATENT AND TRADEMARK OFFICE
CERTIFICATE OF CORRECTION

PATENT NO. : 4,466,299
DATED : August 21, 1984
INVENTOR(S) : James J. Mross, Howard F. Traeder, Robert M. Seidl It is certified that error appears in the above-identified patent and that said Letters Patent is hereby corrected as shown below:

Column 1, line 6, "radical" should read -- radial --.

Column 2, line 62, "as" should read -- an --.

Column 3, line 17, "consideration" should read -- considerations --.

Column 3, line 64, "fuction" should read -- function --.

Column 4, line 57, before "dimensional" add -- the --.

Column 5, line 12 (claim 1), after "stator" insert -- shaft --.

Column 5, line 55 (claim 4), after "providing" insert -- relative --.

Signed and Sealed this

Second Day of July 1985

[SEAL]

Attest:

DONALD J. QUIGG

Attesting Officer    Acting Commissioner of Patents and Trademarks